(12) United States Patent
Shirazee et al.

(10) Patent No.: US 11,901,765 B2
(45) Date of Patent: Feb. 13, 2024

(54) FLUID CORE ELECTROMAGNETIC MACHINE

(71) Applicant: EPROPELLED LIMITED, South Glamorgan (GB)

(72) Inventors: Nabeel Ahmed Shirazee, Cardiff (GB); Narotam Singh Grewal, Sanbornton, NH (US)

(73) Assignee: EPROPELLED LIMITED, Cardif (GB)

( * ) Notice: Subject to any disclaimer, the term of this patent is extended or adjusted under 35 U.S.C. 154(b) by 0 days.

(21) Appl. No.: 17/710,305

(22) Filed: Mar. 31, 2022

(65) Prior Publication Data
US 2022/0320917 A1 Oct. 6, 2022

(51) Int. Cl.
*H02K 1/02* (2006.01)
*H02K 3/32* (2006.01)

(52) U.S. Cl.
CPC ............. *H02K 1/02* (2013.01); *H02K 3/32* (2013.01)

(58) Field of Classification Search
CPC ... H02K 1/02; H02K 1/146; H02K 3/32; H02K 21/22
See application file for complete search history.

(56) References Cited

U.S. PATENT DOCUMENTS

| | | | | |
|---|---|---|---|---|
| 6,489,694 B1 * | 12/2002 | Chass | ................ | H02K 7/1846 310/152 |
| 9,787,154 B2 * | 10/2017 | Williams | ................ | H02K 1/20 |
| 10,903,729 B1 * | 1/2021 | Cunnyngham | ........ | H02K 1/265 |
| 2008/0238220 A1 * | 10/2008 | El-Rafaie | ................ | H02K 1/12 310/48 |
| 2009/0134719 A1 | 5/2009 | Tomsic | | |
| 2015/0076960 A1 * | 3/2015 | Detloff | ................ | H02K 44/18 310/273 |
| 2015/0171698 A1 * | 6/2015 | Urschel | ................ | H02K 7/09 310/11 |

FOREIGN PATENT DOCUMENTS

DE 102019106801 A1 9/2020
WO WO 2013/108943 A1 7/2013

OTHER PUBLICATIONS

Search Report under Section 17 for Application No. GB2104649.5, dated Sep. 3, 2021, 3 pages.
International Search Report and Written Opinion for International Application No. PCT/US2022/022841, dated Jun. 13, 2022, 9 pages.

* cited by examiner

*Primary Examiner* — Dang D Le
(74) *Attorney, Agent, or Firm* — Studebaker & Brackett PC

(57) ABSTRACT

The present disclosure relates to electromagnetic motors. In some disclosed embodiments, an electromagnetic motor or generator comprise a coil and a stator comprising a 3D-printed former disposed within the coil, the former comprising a cavity containing fluid particles of material in liquid or powdered form, the particles having a relative permeability which is greater than that of air. The particles are free to move and align with the magnetic field in manner according to the strength and pattern of the induced field.

15 Claims, 3 Drawing Sheets

FLUID CORE ELECTROMAGNETIC MACHINE

TECHNICAL FIELD

The present disclosure relates to electromagnetic devices and more particularly, but not solely, to electrical machines such as motors and generators.

BACKGROUND ART

Billions of electromagnetic devices, such as solenoids, transformers, coils, inductors, chokes, motors and generators are manufactured each year. The majority of such devices have electrical windings in the form of insulated conductors, which are wound around yokes, formers or other cores. In order to improve the performance of the device, the core may comprise a material having a relative permeability substantially greater than that of air which is 1. In electromagnetism the permeability is the measure of magnetisation that a material obtains in response to an applied magnetic field. The relative permeability of a magnetic material, designated $\mu r$, is the ratio of its absolute permeability $\mu$ to that of air $\mu_0$. Typically, the coils of motors, generators and other electromagnetic devices are disposed around a laminated core of ferromagnetic material. Hitherto, such cores have been complex in construction and/or heavy due to the weight of the material.

With the foregoing in mind, disclosed is an improved electromagnetic device with fewer components and/or a lighter or a more efficient configuration.

SUMMARY

In accordance with the present disclosure there is provided an electromagnetic device comprising a coil and a former which defines a core of the coil, the former comprising a cavity containing a fluid having a relative permeability greater than that of air.

An electromagnetic device in accordance with the present disclosure is lighter than conventional devices due to the presence of the cavity in the former and the use of a fluid inside the cavity which is lighter than conventional solid materials of the kind used in known devices.

The particles may be arranged to move freely within the cavity, so that they can move to areas of high magnetic flux and thus areas of low flux do not unnecessarily contain particles, thereby reducing the volume of the particles that are needed and helping to reduce weight.

The cavity may be fully or partially filled with the fluid. The fluid may be a powder or a liquid comprising particles of a material having a relative permeability greater than 1.

In some embodiments, the relative permeability of the particles is greater than 1.

The particles comprise picoparticles, nanoparticles or microparticles of the material. The flux alignment of particles requires less magnetic field and therefore less current is required to orient the grains and domains in the flux aligned direction.

The fluid may comprise a ferrofluid, such as a colloidal liquid comprising ferromagnetic, or ferrimagnetic particles or nanoparticles suspended in a carrier fluid such as an organic solvent or water. Ferrofluids are at least 5 times lighter than comparable solid ferromagnetic materials of the kind conventionally used as magnetic cores. However, the relative permeability of the fluid can be greater than air and thus the performance of the electrical machine is improved.

The use of a fluid also helps to ensure uniform cooling and heating of the core.

The former may be formed by 3d printing or depositing a former material. The material can be any material including magnetic and/or non-magnetic material. The former may be formed by welding shapes.

The fluid may be sealed in the cavity in the former closed by encapsulation, by overprinting or depositing or plugging, or by applying a closure which may have a complementary shape to that of the former.

The coil may be wound around the former or the former may be inserted into a preformed coil.

The former may comprise a plurality of regions defining the cores of respective coils, each region of the former comprising a cavity containing said fluid.

The cavities of a plurality of the regions of the former may be interconnected by a fluid passageway which may extend through the former.

The electromagnetic device may comprise a motor or generator, the regions of the former defining respective poles of a stator or rotor of the motor or generator. In some embodiments, a motor or a generator can comprise the stator, and a plurality of regions of the former can define respective poles of the stator.

The former or each cavity and/or any connecting passageway may be divided into a plurality of generally planar parallel chambers to form a structure akin to a conventional laminated ferromagnetic core with improvements to allow for fluid movement and/or transfer. Adjacent chambers of the cavity may be connected by one of more apertures. For example, a first chamber of the plurality of generally planar parallel chambers may be adjacent to a second chamber of the plurality of generally planar parallel chambers, and the first chamber can be connected to the second chamber through an aperture. The generally parallel plane of the chambers may extend generally normal to the direction in which the former is printed or deposited. The planar chambers may also take different shapes.

In some embodiments, an electromagnetic device may comprise a stator comprising a cavity disposed generally circumferentially around a central axis of the stator, wherein the cavity comprises a fluid configured to magnetize in response to an applied magnetic field; and a rotor configured to rotate about the stator. The fluid may comprise a powder or a liquid, wherein the powder or the liquid comprise particles of a material. A relative permeability of the particles can be greater than 1.

In some embodiments, an electromagnetic device may comprise a coil disposed around a portion of a stator, wherein the portion of the stator comprises a cavity containing a fluid configured to magnetize in response to an applied magnetic field; and a rotor configured to rotate about the stator.

BRIEF DESCRIPTION OF DRAWINGS

Embodiments will now be described by way of an example only and with reference to the accompanying drawings, in which.

DETAILED DESCRIPTION

Figure 1:
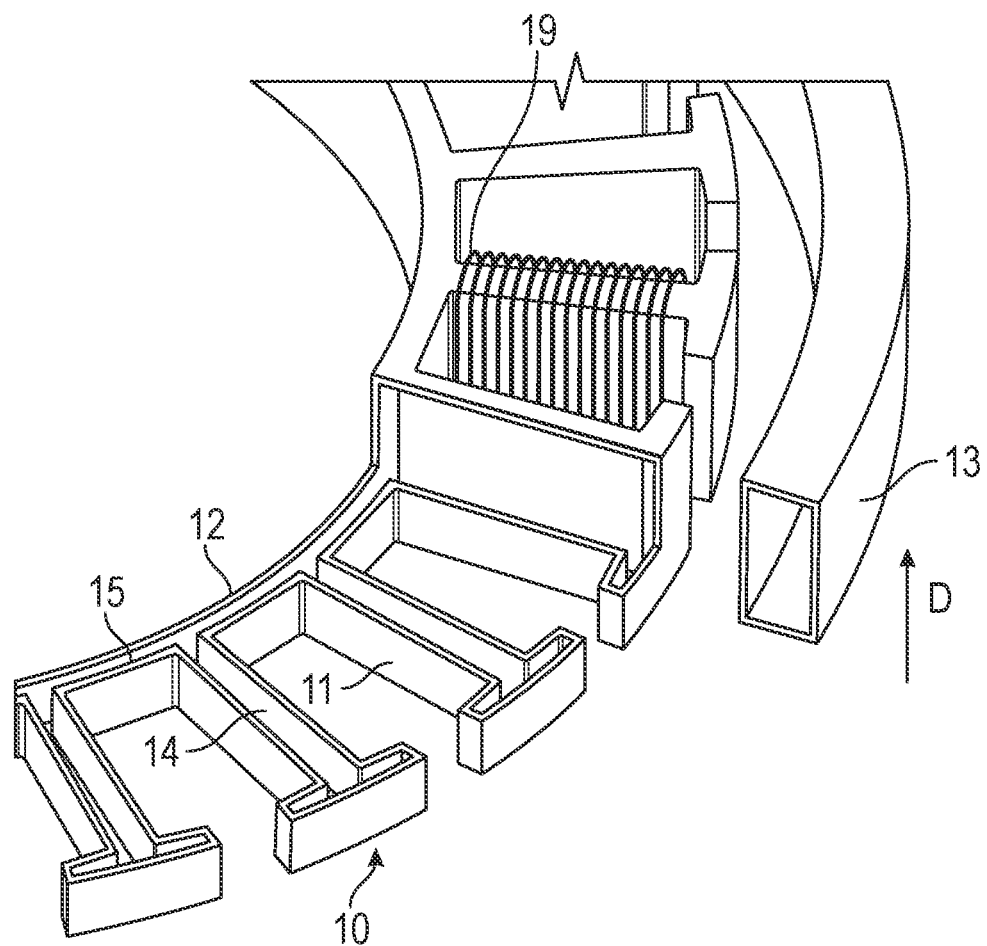
FIG. 1 is a part sectional isometric view of an embodiment of an electrical motor including a portion of a stator.

Disclosed are embodiments of electromagnetic devices. For example, an electromagnetic device can comprise a coil and a former which defines a core of the coil, the former comprising a cavity containing a fluid having a relative permeability greater than that of air. The former may be a portion of the stator. The electromagnetic device may be lighter than conventional devices due to the presence of the cavity in the former and the use of a fluid inside the cavity which is lighter than conventional solid materials of the kind used in known devices. For example, the particles may move to areas of high magnetic flux and areas of low flux do not unnecessarily contain particles.

The fluid may be a powder or a liquid, wherein the powder or the liquid comprise particles having a relative permeability greater than 1. The particles can comprise picoparticles, nanoparticles or microparticles of the material. The flux alignment of particles requires less magnetic field and therefore less current is required to orient the grains and domains in the flux aligned direction.

The fluid may comprise a ferrofluid, such as a colloidal liquid comprising ferromagnetic, or ferrimagnetic particles or nanoparticles suspended in a carrier fluid such as an organic solvent or water. Ferrofluids are at least 5 times lighter than comparable solid ferromagnetic materials of the kind conventionally used as magnetic cores.

The stator and/or rotor may be configured, through the use of the fluid, to provide uniform cooling and heating of the stator, fluid, former, and/or coils.

The former may be formed by 3d printing or depositing a former material. The material can be any material including magnetic and/or non-magnetic material. The former may be formed by welding shapes. The fluid may be sealed in the cavity in the former closed by encapsulation, by overprinting or depositing or plugging, or by applying a closure which may have a complementary shape to that of the former.

The coil may be wound around the former or the former may be inserted into a preformed coil. The former may comprise a plurality of regions defining the cores of respective coils, each region of the former comprising a cavity containing said fluid. The cavities of a plurality of the regions of the former can be interconnected by a fluid passageway which may extend through the former.

The electromagnetic device may comprise a motor or generator, the regions of the former defining respective poles of a stator or rotor of the motor or generator. In some embodiments, a motor or a generator can comprise the stator, and a plurality of regions of the former can define respective poles of the stator.

The former or each cavity and/or any connecting passageway may be divided into a plurality of generally planar parallel chambers to form a structure akin to a conventional laminated ferromagnetic core with improvements to allow for fluid movement and/or transfer. Adjacent chambers of the cavity may be connected by one of more apertures. For example, a first chamber of the plurality of generally planar parallel chambers may be adjacent to a second chamber of the plurality of generally planar parallel chambers, and the first chamber can be connected to the second chamber through an aperture. The generally parallel plane of the chambers may extend generally normal to the direction in which the former is printed or deposited. The planar chambers may also take different shapes.

In some embodiments, an electromagnetic device may comprise a stator comprising a cavity disposed generally circumferentially around a central axis of the stator, wherein the cavity comprises a fluid configured to magnetize in response to an applied magnetic field; and a rotor configured to rotate about the stator. The fluid may comprise a powder or a liquid, wherein the powder or the liquid comprise particles of a material. A relative permeability of the particles can be greater than 1.

In some embodiments, an electromagnetic device may comprise a coil disposed around a portion of a stator, wherein the portion of the stator comprises a cavity containing a fluid configured to magnetize in response to an applied magnetic field; and a rotor configured to rotate about the stator.

Referring to FIG. 1 of the drawings, there is shown an embodiment of an electrical device, such as an electrical motor, in accordance with the present disclosure. The motor may comprise a stator and a rotor. The motor can comprise a stator having a former 10 which may be formed by 3D printing or depositing successive layers in direction D. For example, the layers may be shown in direction D in FIG. 2. Direction D can reflect a direction along a center of a rotor (e.g., axial direction).

The former 10 can comprise a plurality of circumferentially-spaced T-shaped fingers 11 which extend generally radially outwardly generally from a center of a stator. T-shaped fingers 11 may comprise an elongated portion extending generally radially outward from a center of a stator and a transverse portion extending to either side of the elongated portion towards the end of the elongated portion. T-shaped fingers 11 can extend radially outward from an inner annular portion 12. Although T-shaped fingers 11 are shown, other shapes may be used. For example, fingers 11 can extend radially outward from an inner annular portion 12.

Former 10 may further comprise a hollow circular portion adjacent to inner annular portion 12.

A coil winding 19 is disposed around each of the fingers 11 to form poles of the stator. The outer ends of each finger 11 can comprise an enlarged head forming respective stator teeth.

The electrical motor further comprises a rotor that can comprise an annular tubular member 13 disposed around the stator. Annular tubular member 13, which is shown as a section in FIG. 1, is disposed around the stator. For example, annular tubular member 13 may form a ring around the stator. The annular member 13 is rotatably supported by a rotor body (not shown) for rotation around the stator. A plurality of permanent magnets (not shown) are disposed around the radially inner (e.g., towards inner annular portion 12) face of the annular tubular member 13. The permanent magnets can be circumferentially spaced from each other by a slot. A radial gap can be provided between the radially outer ends of the stator teeth and the radially inner face of the rotor magnets. In some instances, the magnets can include a soft ferromagnetic material or cavity sections defined above. In some embodiments, the electrical motor may be a reluctance machine.

In accordance with the present disclosure, the former 10 is hollow and defines cavities 14 inside each stator finger 11, the cavities 14 of adjacent fingers 11 being interconnected by a passageway 15 which extends around the annular central portion 12 of the former 10. The hollow former 10 can be filled with a ferromagnetic fluid. The fluid can be sealed in the cavity in the former by encapsulation, by overprinting or depositing or plugging, or by applying a closure which may have a complementary shape to that of the former.

The annular tubular member 13 of the rotor may also be filled with a ferromagnetic fluid.

In use, when an electrical current is applied to the stator coils, they each generate a magnetic field which can induce cooperation with the rotor magnets to cause rotation of the rotor. The ferromagnetic particles within the ferrofluid contribute to the field produced by the coil. The magnetic field produced by the coil aligns the particles along the lines of magnetic flux and pulls them towards areas where the magnetic field is the strongest. The magnetic domains in the particulate material align, so both the coil and the ferromagnetic fluid cooperate to produce a magnetic field. The coil and the ferromagnetic fluid together may produce a magnetic field greater than would be capable of the coil or the ferromagnetic fluid alone. The ferroparticles in the fluid in the annular tubular member 13 of the rotor can concentrate and align around the permanent magnets.

Figure 2:
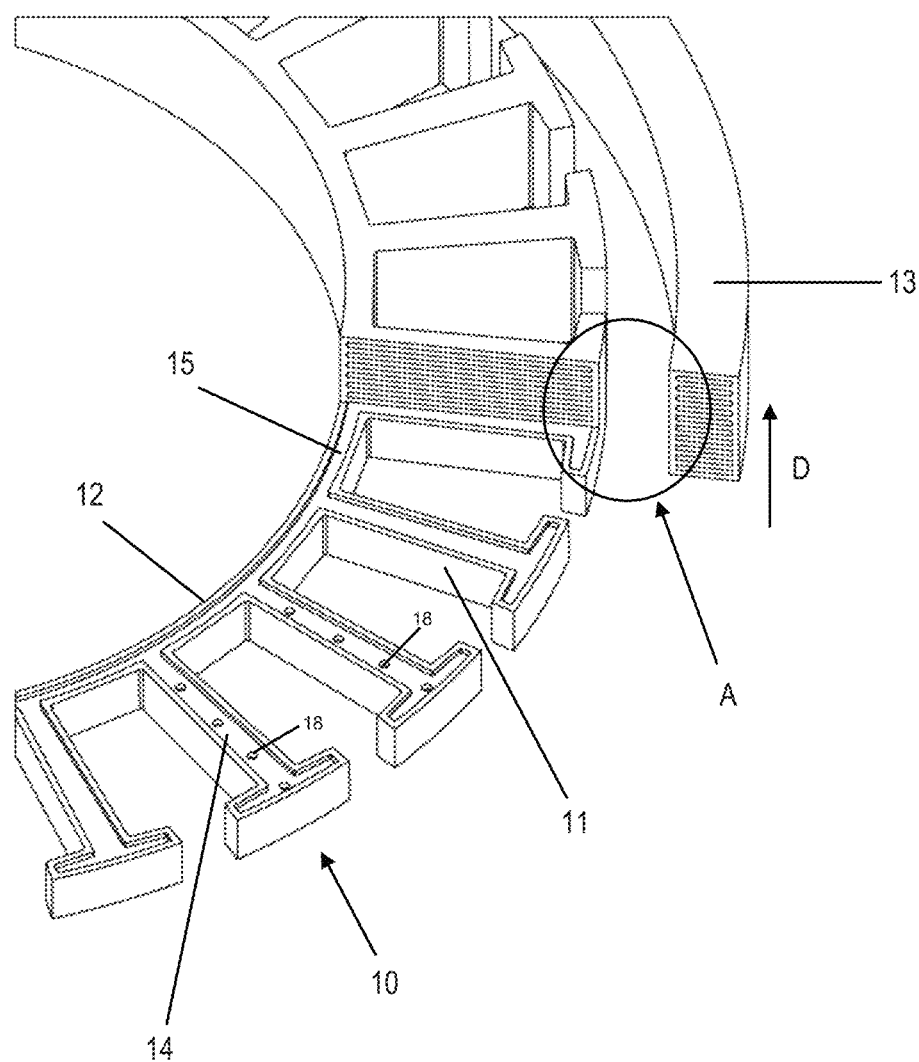
FIG. 2 is a part sectional isometric view of an embodiment of an electrical motor including a portion of a stator and a portion of a rotor.
Figure 3:
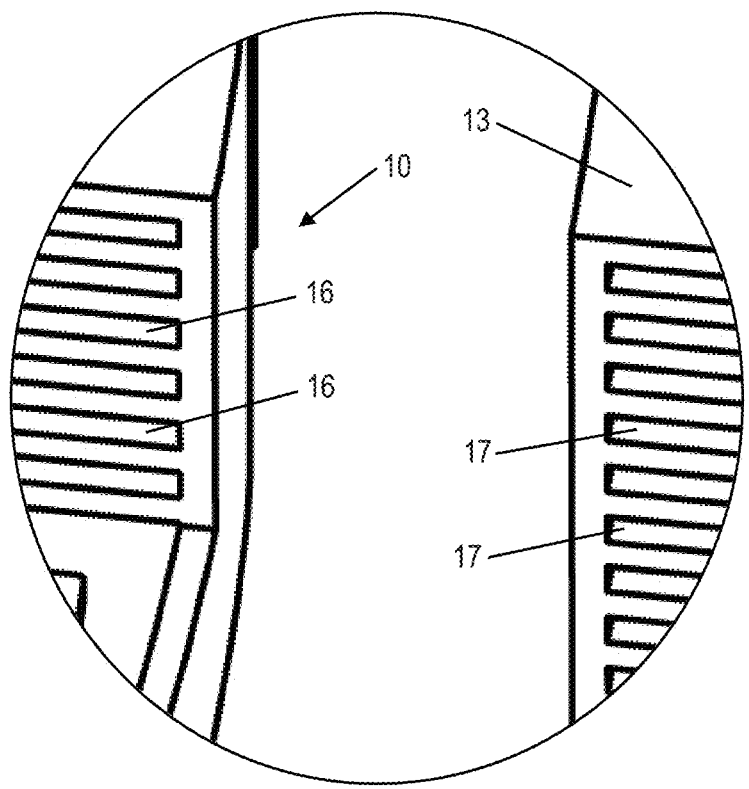
FIG. 3 is an enlarged view of a region A encircled in FIG. 2.

Referring to FIGS. 2 and 3 of the drawings, there is shown an embodiment of an electrical motor in accordance with the present disclosure which is similar in construction to the motor of FIG. 1 and like parts are given like reference numerals. In this embodiment, the cavity 14 in each finger 10 and the passageway 15 of the stator 10 is divided into a plurality of generally planar parallel chambers 16 to form a structure akin to a conventional laminated ferromagnetic core. Adjacent chambers 16 of each cavity 14 may be interconnected by apertures 18. Likewise, the hollow interior of the annular tubular member 13 of the rotor are divided into a plurality of generally planar parallel chambers 17 to form a structure akin to a conventional laminated ferromagnetic rotor body. The planes of the chambers 16, 17 of the stator and rotor extend parallel to each other and normal to the direction D. As discussed above, direction D can be the direction in which the former and/or rotor are printed or deposited. Direction D can be in a direction along a central axis of the stator and/or rotor (e.g., an axis that the rotor rotates around). In some embodiments, the planes of the chambers 16, 17 of the stator and rotor can generally extend radially from a center axis of the rotor. The planes of the chambers may take different complex shapes. The former can also be made using a different manufacturing process or processes.

The present disclosure describes an electromagnetic motor, generator or other device comprising a coil and a 3D-printed former 10 which defines a core of the coil, the former 10 comprising a cavity 14 containing fluid particles of material in liquid or powdered form, the particles having a relative permeability which can be greater than that of air. The particles are free to move and align with the magnetic field in manner according to the strength and pattern of the induced field.

It will be appreciated that the present disclosure may be incorporated into motors, generators, combined motors and generators or an electrical machine of any type.

What is claimed is:

1. An electromagnetic device comprising:
   a coil;
   a stator comprising a former, wherein the former is disposed within the coil, wherein the former comprises a cavity containing a fluid configured to magnetize in response to an applied magnetic field; and
   a rotor configured to rotate about the stator, wherein the cavity comprises a plurality of regions of the former that are interconnected by a fluid passageway.

2. An electromagnetic device as claimed in claim 1, wherein the fluid is arranged to move freely within the cavity.

3. An electromagnetic device as claimed in claim 1, wherein the cavity is fully or partially filled with the fluid.

4. An electromagnetic device as claimed in claim 1, wherein the fluid comprises a powder or a liquid comprising particles of a material.

5. An electromagnetic device as claimed in claim 4, wherein a relative permeability of the particles is greater than 1.

6. An electromagnetic device as claimed in claim 4, wherein the particles comprise picoparticles, nanoparticles or microparticles of the material.

7. An electromagnetic device as claimed in claim 1, wherein the fluid comprises a ferrofluid comprising ferromagnetic, or ferrimagnetic particles suspended in a carrier fluid.

8. An electromagnetic device as claimed in claim 1, wherein the former is formed by 3d printing, depositing a former material, or welding.

9. An electromagnetic device as claimed in claim 1, wherein the fluid is sealed in the cavity in the former closed by encapsulation, by overprinting or depositing, or by applying a closure which may have a complementary shape to that of the former.

10. An electromagnetic device as claimed in claim 1, wherein the former comprises a plurality of regions each configured to be disposed within a respective coil, wherein each region of the former comprises a cavity containing the fluid.

11. An electromagnetic device as claimed in claim 1, wherein a motor or a generator comprises the stator, and wherein a plurality of regions of the former define respective poles of the stator.

12. An electromagnetic device as claimed in claim 1, wherein the former or cavity and any connecting passageway is divided into a plurality of generally planar parallel chambers.

13. An electromagnetic device as claimed in claim 12, wherein a first chamber of the plurality of generally planar parallel chambers is adjacent to a second chamber of the plurality of generally planar parallel chambers, and wherein the first chamber is connected to the second chamber through an aperture.

14. An electromagnetic device as claimed in claim 12, wherein the generally parallel plane of the chambers extends generally normal to the direction in which the former is printed or deposited.

15. An electromagnetic device as claimed in claim 1, wherein the rotor comprises a tube configured to contain the fluid.

* * * * *